April 7, 1936. H. T. KINGSBURY 2,036,635
SPRING SCALE
Filed July 14, 1932 3 Sheets-Sheet 1
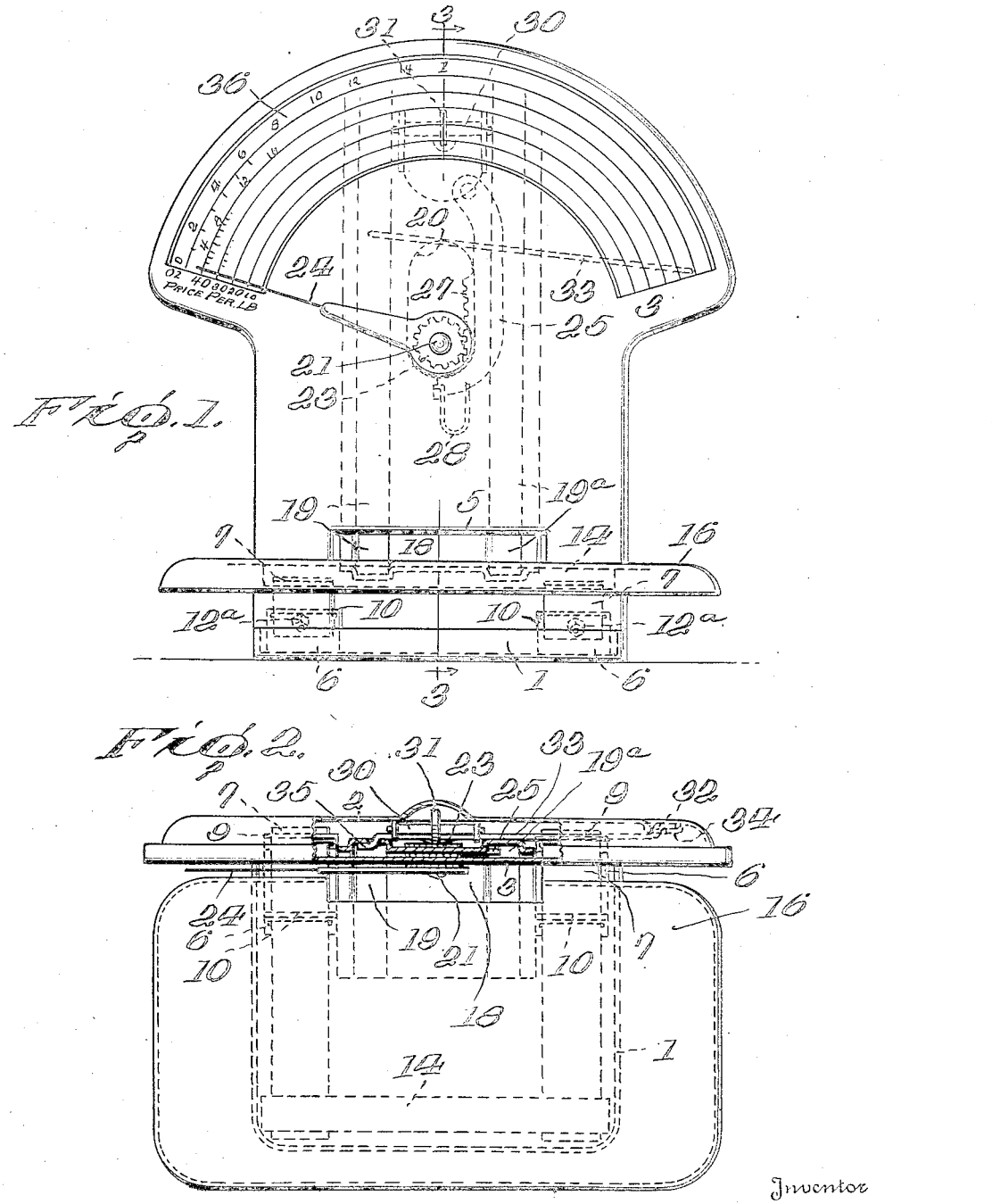
Inventor
H. T. KINGSBURY
By Sturtevant Mason Porter
Attorneys April 7, 1936. H. T. KINGSBURY 2,036,635
SPRING SCALE
Filed July 14, 1932 3 Sheets-Sheet 2
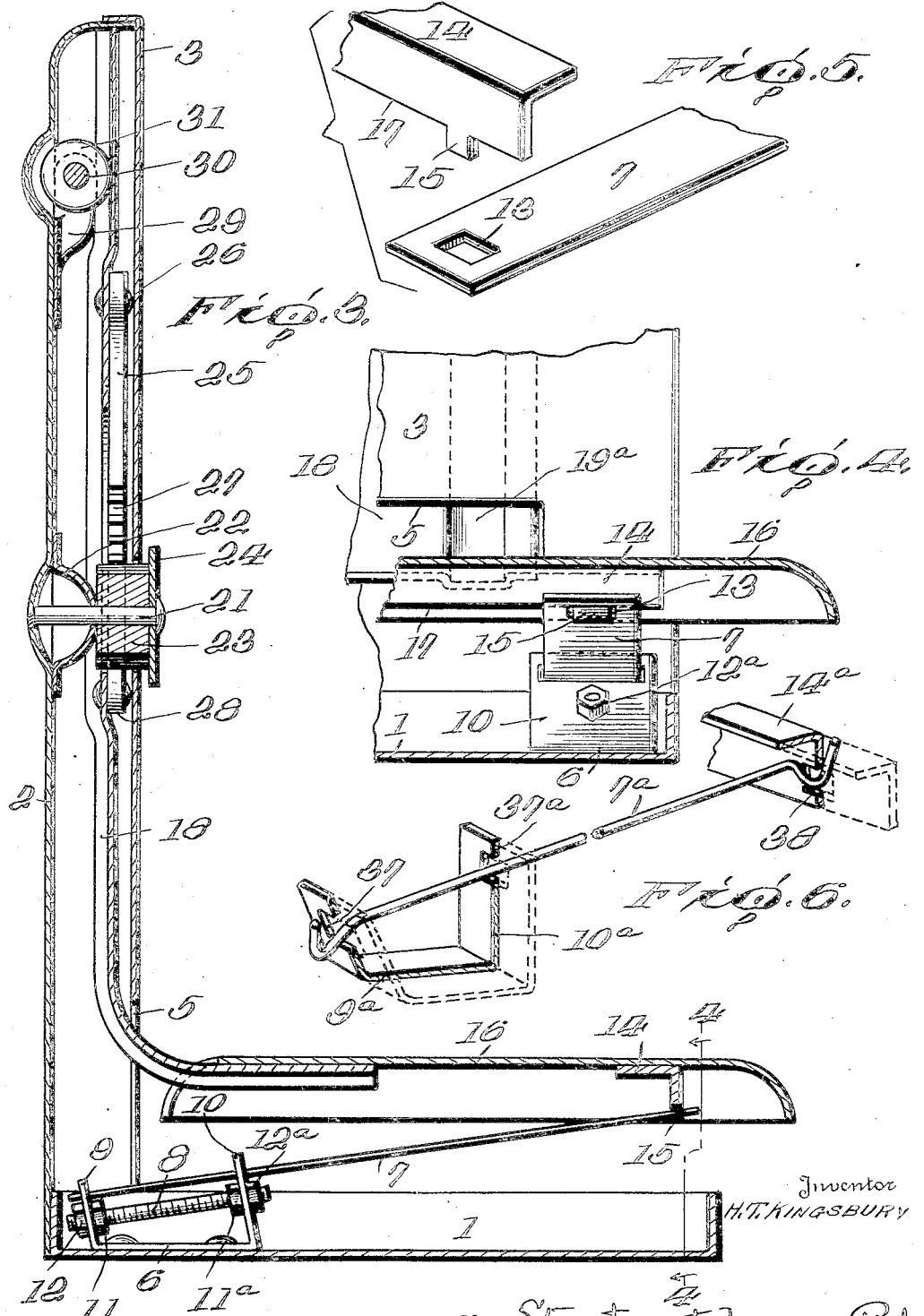
Inventor
H. T. KINGSBURY
By Sturtevant Mason Porter
Attorneys

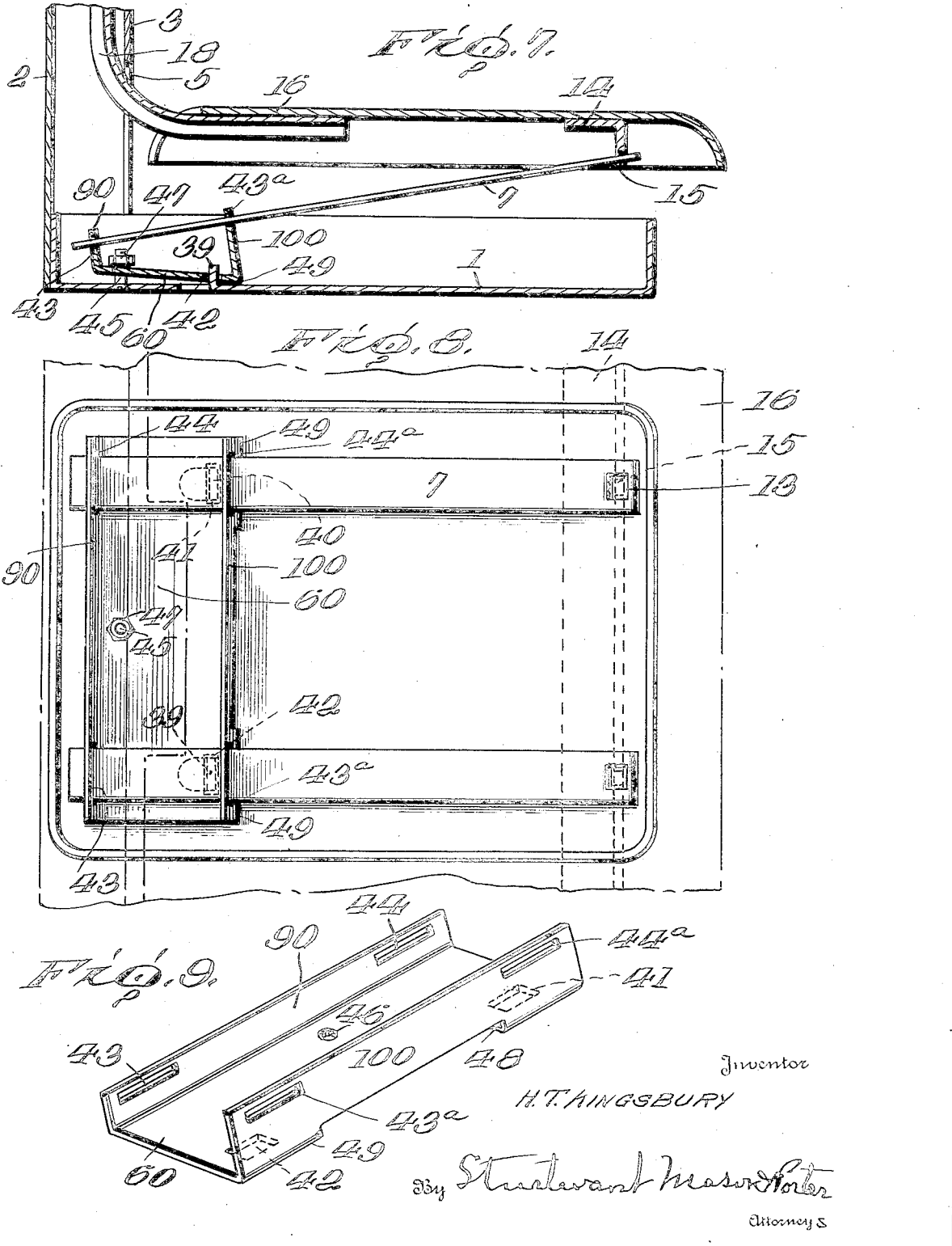

Patented Apr. 7, 1936

2,036,635

UNITED STATES PATENT OFFICE 2,036,635

SPRING SCALE

Harry T. Kingsbury, Keene, N. H., assignor to Kingsbury Mfg. Company, Keene, N. H., a corporation of New Hampshire Application July 14, 1932, Serial No. 622,520

15 Claims. (Cl. 265—68)

This invention relates to improvements in scales, and more particularly to spring scales which are adapted for use as toys.

An object of the invention is to provide a weighing scale wherein spring members support the load platform at one end thereof.

A further object of the invention is to provide a weighing scale wherein flat resilient or spring members support the platform and aid in positioning the same.

A still further object of the invention is to provide a weighing scale wherein the spring members may be adjusted when so desired.

The invention further provides a weighing scale wherein the platform has an upright portion which, in turn, carries means for directly operating the indicating mechanism whereby the necessity of using links and the like is eliminated.

The invention still further provides a weighing scale wherein novel means, working in conjunction with the supporting springs, are provided to prevent tilting of the platform and aid in positioning the same.

It is a further object of the invention to provide a weighing scale which is easily and cheaply manufactured and which is of simple construction and may, therefore, be used as a toy scale for children.

In the drawings:—

Figure 1 is a front view of the scale.

Fig. 2 is a plan view of the same, partly in section.

Fig. 3 is a side view of the assembled scale in section.

Fig. 4 is a fragmentary view taken along the line 4—4 of Fig. 3.

Fig. 5 is a detail view showing a spring member separated from the platform bracket.

Fig. 6 is a modified form of spring and bracket support.

Fig. 7 is a side view in section showing another form of adjusting bracket.

Fig. 8 is a top plan view of the same.

Fig. 9 is a perspective view showing the bracket in detail.

The invention generally provides a toy weighing scale having an upright casing, which has an indicating dial on one face thereof. The load platform rests on and is supported by flat resilient members which may be adjusted when desired. The load platform is provided with an upright portion extending upwardly within the casing. This upright portion has an opening therein and carries a rack or similar device which is held in constant engagement with a pinion which, in turn, carries an indicating hand. Any load placed on the platform will cause the upright portion thereof to be lowered and this movement will be imparted through the rack and pinion to the indicator which will register the weight on the dial face. A distance rod loosely fastened to the casing and the upright portion of the platform prevents sidewise tilting of said platform. Likewise a roller mounted in a bracket secured to the casing bears lightly against the upright portion of the platform and thus prevents a counter-clockwise movement of the platform (Fig. 3). The spring members bearing against one end of the platform prevent any clockwise movement of the same. The spring members return the platform and indicating mechanism to their normal positions when the load is removed from the platform.

The supporting base 1 has an upright back casing or standard 2 secured thereto. The back casing has a front plate 3 in which is an opening 5. The operating parts of the scale are thus completely enclosed. Secured to the base 1 are slightly bendable bracket members 6 in which one end of each of the flat springs 7 are mounted. Each bracket is provided with a threaded bolt 8 the ends of which extend through the bracket arms 9, 10 thereof. The bolt 8 has thereon nuts 11, 11a on the inside of said bracket arms, and nuts 12, 12a on the outside thereof. The opposite ends of each of the flat springs 7 have an opening 13 therein. An angle arm 14 having projections 15 thereon is secured to the underside of the platform 16. The projections 15 extend through the openings 13 in the spring members and the edge 17 of said angle arm rests on the spring members. The flat spring members 7 thus support the platform and also aid in keeping said platform in a level position.

The platform 16 has secured thereto an upright portion 18 which extends through the opening 5 in the front plate 3 and upwardly between the said front plate and the back casing. The upright portion 18 is provided with rib portions 19, 19a which serve to strengthen the same. The upright portion is provided with a vertical opening 20. A stud shaft 21, which is journaled in the back casing 2 and a bearing piece 22 secured to said casing, carries a pinion gear 23 which extends through the vertical opening 20 in the upright portion and the opening 4 in the front plate and has secured thereto an indicating hand 24. A rack 25 pivotally mounted on the upright portion 18 by a pin 26 has teeth 27 which engage the pinion gear 23. A spring 28 secured to the upright portion holds the toothed rack in constant light contact with the pinion gear. It is thus apparent that the upright portion 18 is permitted to vertically reciprocate with the platform 16.

A bracket 29 secured to the back casing carries a shaft 30 on which is mounted a roller 31 which lightly touches the upright portion 18. This roller prevents any counterclockwise tilting of the platform (Fig. 3). An offset end 32 of a distance rod 33 is loosely mounted in an inwardly projecting portion 34 of the back casing 2. The other offset end 35 of the distance rod 33 is loosely mounted in the rib portion 19 of the upright portion 18. It is thus clear that the end of rod 33 is adapted to slightly move with the rise and fall of the upright portion, but said rod prevents any sidewise tilting of the platform. The action of the spring members 7 on the extreme end of the platform 16 will tend to prevent any clockwise tilting of said platform.

The front plate 3 is provided with an indicating dial 36 on its face. The indicating hand rotates over the face of this dial when any load is applied to the platform.

In Figure 6 a round spring 7ª is shown. In this case one end of the spring 7ª extends through openings 37, 37ª in the bracket arms 9ª, 10ª of the bracket 6ª. The other end of the spring 7ª extends through an opening 38 in the angle arm 14ª. The bracket 6ª may also be provided with adjusting means similar to that shown in Fig. 3.

The adjusting bracket 6 is provided so that any variation in the resiliency or thickness of the flat spring members 7 may be compensated for. The arms 9 and 10 of the bracket 6 may be bent slightly and so, by adjusting the nuts on the bolts 8, the distance between the arms 9 and 10 may be varied and in this manner the effective resistance offered by the spring 7 to the downward movement of the platform 16 may be changed. In practice, to reduce the resistance offered by the spring members, it will be sufficient to loosen the nut 11ª and bend the arm 10 in a counterclockwise direction and then tighten the nut 12ª. This will decrease the distance between the arms 9 and 10 and increase the length of the spring 7 from the arm 10 to the platform bracket projection 15. Likewise, to increase the resistance offered by the spring members, it is sufficient to loosen the nut 12ª and bend the arm 10 in a clockwise direction and then tighten the nut 11ª. This increases the distance between the arms 9 and 10 and decreases the length of the spring 7 from the arm 10 to the projection 15. This adjustment is quite apparent when it is considered that as a flat spring member is increased in length the resistance offered thereby to a load is decreased and conversely, when the length of a flat spring member is decreased, the resistance offered thereby is increased.

Another form of adjusting bracket is equally advantageous and is shown in Figs. 7, 8, and 9. In this form the base 1 has upwardly projecting tongs 39, 40 which extend through openings 41, 42 in a single bracket member 60 whereby the bracket is held against sliding. The bracket arms 90, 100 have openings 43, 44, 43ª, 44ª through which one end of each flat spring 7 extends and is held. A screw 45 passes through the base 1 then upwardly through an opening 46 centrally located in the bracket 60. A nut 47 is applied to the end of the screw 45 to prevent the bracket from tilting when a load is applied to the platform 16. A slot 48 extends partly across the bracket 60 at the point where the arm 100 is bent. In this form, the spring arm 100 may be adjusted manually to compensate for any uneven pressure of the flat springs 7 due to possible variations in the thickness thereof. The screw 45 and nut 47 may be adjusted to tilt the bracket 60 on the edge 49 and thus raise or lower the platform 16 so that the indicating hand 24 will point to the zero mark on the dial face 36.

It is believed that the foregoing description renders the operation of the scale perfectly clear. When a load is placed on the platform 16, the platform and its upright portion 18 will be lowered. The rack 25 will likewise move with the upright portion and will consequently rotate the pinion gear 23, which, in turn, rotates the indicating hand 24. It is clear that since the spring member 7 exerts pressure on only one end of the platform, the said platform will be prevented from tilting in a clockwise direction (Fig. 3), and the roller 31 will prevent said platform from tilting in a counterclockwise direction. The distance rod 33 prevents sidewise tilting of the platform, but, at the same time, allows the upright portion to move vertically.

It is obvious that minor changes in the details of construction and the arrangement of the parts may be made without departing from the spirit of the invention as set forth in the appended claims.

Having thus described the invention, what I claim as new and desire to secure by Letters Patent, is:

1. A scale having a base, a standard, a platform, an upright portion secured thereto, an indicating mechanism, means for operating the same, means including spring members for supporting said platform, means secured to said standard for controlling the position of said platform, said means including a distance rod, and a roller contacting with said upright portion.

2. A scale having a base, a casing, a platform, an upright portion secured thereto, an indicating mechanism, means for operating the same, flat resilient members adjustably secured to said base and adapted to support said platform, and means for controlling the position of said platform, said last-named means including a roller carried by said casing and bearing against said upright portion.

3. A scale comprising a base, a casing, a platform having an upright portion thereon, an indicating mechanism, means for operating the same, and means for supporting and controlling the position of said platform, said means including flat spring members secured to said base, and means carried by said casing and adapted to contact with said upright portion.

4. A scale comprising a base, a casing, a platform having depending members thereon, an indicating mechanism, means for operating the same, spring members adapted to support said platform, one end of said spring members being adjustably secured to said base, the other end of said spring members having an opening through which said depending members extend, and means for controlling the position of said platform.

5. A scale having a base, a standard, a platform having an upright portion secured thereto, said upright portion extending upwardly within said standard, an indicating mechanism, means associated with said upright portion for operating said indicating mechanism, and means for supporting said platform, said means including resilient members having one end secured adjacent one edge of said platform and the other end mounted on said base.

6. A scale having a base, a standard, a platform having an upright portion secured thereto, an indicating mechanism, means for operating said indicating mechanism, means including flat resilient members for supporting said platform, said resilient members having one end secured adjacent an edge of said platform and the other end secured to said base, and means between the standard and upright for controlling the position of said platform.

7. A scale having a base, a standard, a platform having an upright portion secured thereto, an indicating mechanism, means including spring members for supporting said platform, and means for controlling the position of said platform, said means including a distance rod secured to said standard and said upright portion.

8. A scale having a base, a standard, a platform, indicating mechanism on said standard, means for operating said indicating mechanism, means including flat resilient members disposed in the same substantially horizontal plane for supporting said platform at one end thereof, and means for varying the resistance offered by said resilient members to the downward movement of said platform.

9. A scale having a base, a standard, a platform, indicating mechanism on said standard, means for operating said indicating mechanism, flat resilient members disposed in the same substantially horizontal plane adapted to support said platform at one end thereof, and means including an adjustable bracket mounted on said base for varying the resistance offered by said resilient members to the downward movement of said platform.

10. A scale comprising a base, a standard, a platform having an upright portion extending within said standard, indicating mechanism, means for operating said indicating mechanism, resilient members adapted to support said platform, a bracket mounted on said base and adapted to support one end of said resilient members, means for connecting the other ends of said resilient members to one edge of said platform, and means for varying the effective length of said resilient members between said bracket and said platform whereby to vary the resistance offered by said resilient members to the downward movement of said platform.

11. A scale comprising a base, a standard, a platform, an indicating mechanism on said standard, means for operating said indicating mechanism, means including a spring member for supporting said platform, means including a bracket member on said base beneath one end of said platform for supporting one end of said spring member, and means including a bracket member depending from the opposite end of said platform for supporting the opposite end of said spring member.

12. A scale comprising a base, a standard, a platform, an indicating mechanism on said standard, means for operating said indicating mechanism, means including a flat spring member for supporting said platform, means including an adjustable bracket member on said base beneath one end of said platform for securing one end of said spring member, and means including a bracket depending from the opposite end of said platform for securing the opposite end of said spring member.

13. A scale comprising a base, a standard, a platform, an indicating mechanism on said standard, means for operating said indicating mechanism, an adjustable bracket secured to said base and including spaced upstanding arms, a depending bracket secured to the under side of said platform, and a spring member having one end thereof carried by said arms and having the opposite end thereof secured to said depending bracket whereby to support said platform.

14. A scale comprising a base, a standard, a platform, an indicating mechanism on said standard, means for operating said indicating mechanism, means including a flat spring member for supporting said platform, an adjustable bracket secured to said base beneath one end of said platform and adapted to support one end of said spring member, said spring member having an opening in the opposite end thereof, and a bracket member depending from the opposite end of said platform and having a downwardly projecting lug to engage the opening in said spring member.

15. A scale comprising a base, a standard, a platform, an indicating mechanism on said standard, means for operating said indicating mechanism, a bracket mounted on said base, means for adjusting said bracket, a bracket secured to the under side of said platform at one end thereof, and a spring member having one end mounted on said adjustable bracket and having the opposite end secured to the bracket on said platform.

HARRY T. KINGSBURY.